United States Patent
Chapweske et al.

(10) Patent No.: US 7,567,270 B2
(45) Date of Patent: Jul. 28, 2009

(54) AUDIO DATA CONTROL

(75) Inventors: Adam M. Chapweske, Chicago, IL (US); Jon N. Swanson, Queensbury, NY (US)

(73) Assignee: Insors Integrated Communications, Chicago, IL (US)

( * ) Notice: Subject to any disclaimer, the term of this patent is extended or adjusted under 35 U.S.C. 154(b) by 905 days.

(21) Appl. No.: 11/059,800

(22) Filed: Feb. 17, 2005

(65) Prior Publication Data

US 2005/0237377 A1    Oct. 27, 2005

Related U.S. Application Data

(60) Provisional application No. 60/564,438, filed on Apr. 22, 2004.

(51) Int. Cl.
H04N 7/15    (2006.01)

(52) U.S. Cl. .............................. 348/14.08; 379/202.01

(58) Field of Classification Search ............... 348/14.08, 348/14.09, 14.05; 379/202.01, 204.01; 370/260
See application file for complete search history.

(56) References Cited

U.S. PATENT DOCUMENTS

| | | | |
|---|---|---|---|
| 6,501,739 B1 * | 12/2002 | Cohen | 370/260 |
| 6,625,271 B1 | 9/2003 | O'Malley et al. | |
| 6,775,247 B1 | 8/2004 | Shaffer et al. | |
| 6,792,092 B1 * | 9/2004 | Michalewicz | 379/202.01 |
| 7,151,762 B1 | 12/2006 | Ho et al. | |
| 7,193,996 B2 | 3/2007 | Dobbins et al. | |
| 7,225,459 B2 | 5/2007 | Magliaro | |
| 2004/0111472 A1 | 6/2004 | Swanson et al. | |
| 2004/0117446 A1 | 6/2004 | Swanson | |
| 2004/0236593 A1 | 11/2004 | Swanson et al. | |
| 2004/0249967 A1 | 12/2004 | Swanson | |
| 2005/0232151 A1 | 10/2005 | Chapweske et al. | |

OTHER PUBLICATIONS

VCON Corp., "VCON User Guide, Version 4.1," VCON Corp., Austin TX, Mar. 2003.

D. Schobben, K. Torkkola, and P. Smaragdis, "Evaluation of blind signal separation methods," in *Proc. Int. Workshop on ICA and BSS (ICA '99)*, 1999, pp. 261-266. The month of publication is not presently available, but the year of publication is sufficiently earlier than the effective U.S. filing date and any foreign priority date so that the particular month of publication is not an issue.

(Continued)

*Primary Examiner*—Stella L Woo
(74) *Attorney, Agent, or Firm*—Greer, Burns & Crain, Ltd.

(57) ABSTRACT

An exemplary method for controlling audio data being communicated between a plurality of users over a packet based network comprises steps of combining a plurality of audio data streams into a single master stream, receiving at least one volume value for at least one of the plurality of audio data streams from each of the plurality of users, and creating a second or decompositor stream for each of the plurality of users using the at least one volume value from said each of the plurality of users. The exemplary method further includes steps of creating a volume adjusted master stream for each of the plurality of users by modifying the master stream with the decompositor stream for said each of the plurality of users.

20 Claims, 3 Drawing Sheets

OTHER PUBLICATIONS

J. P. Reilley, L.C. Mendoza, "Blind Signal Separation for Convolutive Mixing Environment Using Spatial-Temporal Processing," Communications Research Laboratory; ICASSP, vol. 3, pp. 1437-1440, Acoustics, Speech, and Signal Processing, 1999. The month of publication is not presently available, but the year of publication is sufficiently earlier than the effective U.S. filing date and any foreign priority date so that the particular month of publication is not an issue.

Rangan, Venkat P, et al. "Communication Architectures and Algorithms for Media Mixing in Multimedia Conferences," IEEE/ACM Transactions On Networking, vol. 1, No. 1, pp. 20-30. 1993. The month of publication is not presently available, but the year of publication is sufficiently earlier than the effective U.S. filing date and any foreign priority date so that the particular month of publication is not an issue.

ITU-T Study Group 15. "A Silence Suppression Scheme for G.729 Optimized for Terminals Conforming to Recommendation V.70," International Telecommunications Union Recommendation G.729, Annex B.; Nov. 1996.

MDL Corp. "Audio Tool Manual," Chapter 3, believed published circa 2003 by MDL Corp. The month of publication is not presently available, but the year of publication is sufficiently earlier than the effective U.S. filing date and any foreign priority date so that the particular month of publication is not an issue.

VCON Corp., "VCON Interactive Group Communication System 2000 (IGC 2000)," VCON Corp., Austin TX, believed to be published circa 2001. The month of publication is not presently available, but the year of publication is sufficiently earlier than the effective U.S. filing date and any foreign priority date so that the particular month of publication is not an issue.

RemoteAbility, Inc. "Interactive Group Communications Systems," RemoteAbility, Inc., published 2001. The month of publication is not presently available, but the year of publication is sufficiently earlier than the effective U.S. filing date and any foreign priority date so that the particular month of publication is not an issue.

\* cited by examiner

AUDIO DATA CONTROL

CROSS REFERENCE

The present application claims priority on U.S. provisional patent application No. 60/564,438 filed on Apr. 22, 2004.

FIELD OF THE INVENTION

The invention is related to methods and systems for controlling real-time audio data communicated over a digital data network.

BACKGROUND OF THE INVENTION

Data communications are widespread and well known. One example of data communication includes real time communication of digital audio data in discrete packets over data networks. By way of particular examples, real-time phone calls and audio/video conferences may communicate voice and other audio data between numerous participants in real time. Recent advances in remote collaboration have introduced new and ever higher levels of demand on audio data communication. Sessions of 20 or more participants are not uncommon, and conferences of into the hundreds or more occur. Numbers of simultaneous participants are expected to continue to grow as long as technology can keep up.

In sessions of this size, bandwidth and processor demands to communicate all of the data between all of the participants can become problematic. Taking a conference with 20 attendees by way of example, each participant may receive multiple video and audio data streams from each other participant. If each participant in a video conference uses two cameras and two microphones, for example, then each participant will receive 38 individual real-time data streams. Providing sufficient capacity, reliability, and control resource for all of this data can be a time consuming and costly effort. As a result, there is a desire to consolidate communications as is practical and efficient to conserve bandwidth and processor resources.

One known bandwidth consolidation practice is to combine audio streams into a single "master stream." For example, all of the microphones from all of the attendees may be communicated to a central network bridge, where they are mixed into a single stream for communication out to all of the participants. While this can reduce required bandwidth, it comes at a cost of limiting or denying the ability to control individual audio data streams. If a particular bundled stream includes data from 20 participants, for example, it may not be convenient or possible to adjust the volume of only participant number 18. Often, only the single master stream can be adjusted. This can cause substantial difficulties, in that microphone placement, settings, ambient noise, and other factors can be very different from participant to participant. One participant may be sending an audio data stream that is low in volume and hard to discern, while another sends one that is quite loud. Also, with reference to video and audio conferences in particular, there is a desire to make the remote experience as close to in-person interaction as is possible. Individual volume controls might be useful to add a "spatial element" to known conferences and phone calls.

Proposals have been made to accomplish some degree of individual volume control. For example, it has been proposed for every conference participant to receive an individual audio stream from every other participant. Each participant could then mix the streams as they are received, adding gain or attenuation to each stream as set by the user. The bandwidth requirements associated with practice of this proposal, however, are quite high. The bandwidth for each participant scales linearly (with a high constant) as the number of streams increases. And if a centralized architecture is used for the conference, the bandwidth for the central hub scales geometrically.

As discussed above, to alleviate the bandwidth requirements a mixer (also referred to as an "audio bridge", "MCU", or "MP") has been proposed to combine every audio stream at a central network location so that they can be combined and transmitted to each participant as a single stream. However, adjusting the volume of each individual participant becomes difficult, as a mixer (e.g., a computer) cannot easily recognize who contributed what to the stream. Methods for breaking apart or decomposing audio streams are available, but they are extremely processor-intensive, they lack desirable accuracy, and in general they are not designed for audio conference signals.

SUMMARY OF THE INVENTION

An embodiment of the present invention is directed to a method for generating personalized audio streams for each participant in a multi-participant audio data sharing event. Methods of the invention may scale linearly with a relatively low constant. These methods lend themselves equally well to DSP- and microprocessor-based platforms (or some hybrid of the two.) Methods of the invention scale well to even large scale conferences (more than 20 users), and advantageously add very little network overhead.

An exemplary method for controlling audio data being communicated between a plurality of users over a packet based network comprises steps of combining a plurality of audio data streams into a single master stream, receiving at least one volume value for at least one of the plurality of audio data streams from each of the plurality of users, and creating a second or "decompositor" stream for each of the plurality of users using the at least one volume value from said each of the plurality of users. The exemplary method further includes steps of creating a volume adjusted master stream for each of the plurality of users by modifying the master stream with the decompositor stream for said each of the plurality of users.

In one exemplary embodiment of the invention, one audio stream P is received from each of a plurality of participants in a real time audio conference. All streams are mixed into one master stream $M = P_1 + P_2 + P_3 \ldots + P_n$; where $P_x$ represents a participant audio stream with $x=1$ to n participants. Gain values G for each individual stream P are also received from each individual participant, and are used to construct a second stream referred to as a "decompositor" stream D for each participant x: $D_x = P_1(1-G_1) + P_2(1-G_2) + P_3(1-G_3) \ldots + P_n(1-G_n)$. The decompositor stream D is then "subtracted" from master stream M to result in decompositor master stream $M_x' = M - D_x$ for communication to the participant x.

DETAILED DESCRIPTION

Before discussing exemplary embodiments of the present invention in detail, it will be appreciated that the invention may be embodied in a method, a system, and/or in a computer program product. For example, a method of the invention may be carried out by one or more users using computers, and a program product of the invention may include computer executable instructions that when executed by one or more computers cause one or more computers to carry out a method of the invention. Further, one or more computer(s) that contains a program product of the invention may embody a system of the invention. It will accordingly be appreciated that in describing a particular embodiment of the present invention, description of other embodiments may also be made. For example, it will be understood that when describing a method of the invention, a system and/or a program product of the invention may likewise be described.

Figure 1:
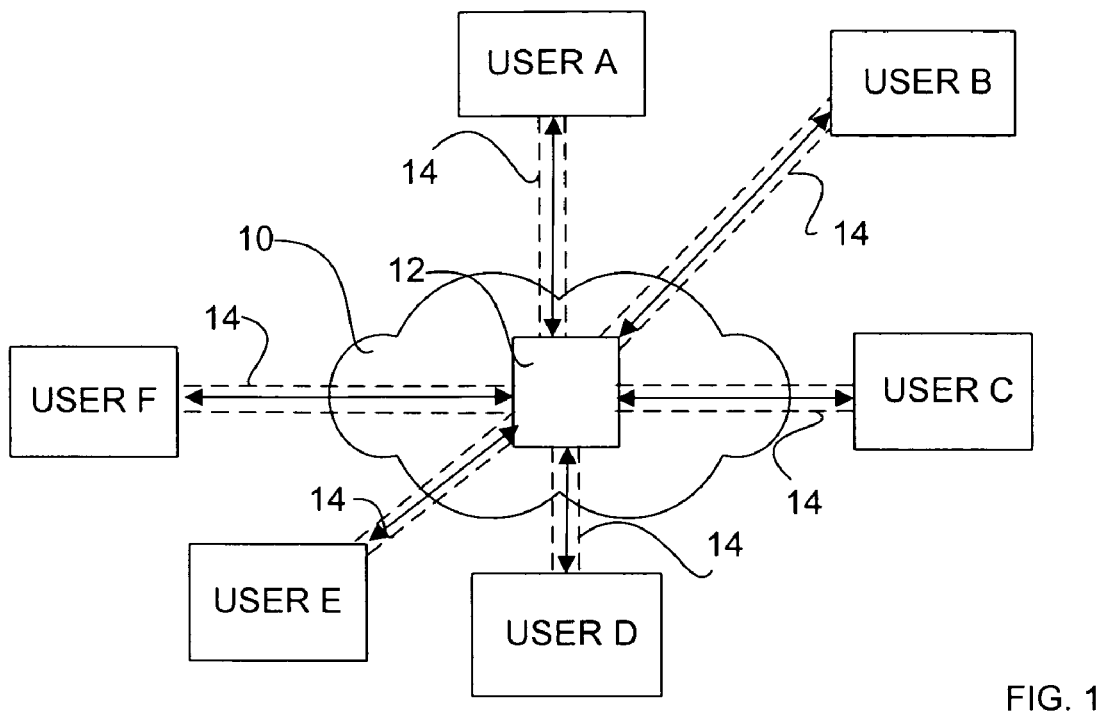
FIG. 1 is a schematic of a network useful for illustrating methods and program products of the invention in a videoconference environment.

Turning now to the drawings, FIG. 1 is a schematic of a network that is useful to describe an exemplary method of the invention. The network shown as a "cloud" 10 includes an interface 12 that links users A-F to one another. The term "interface" as used herein is intended to be broadly interpreted as comprising one or more components for linking communications between users. It may include, for example, one or more computers having a plurality of communication ports, a software component running on one or more computers that facilitate communications, a networking card(s), a modem(s), and the like. The interface 12 may be referred to in the video/audio conferencing and networking arts as a "bridge," which generally comprises a computer or router having a plurality of ports for interconnecting the users A-F. As used herein the term port is intended to be broadly interpreted as a physical or logical destination and/or origination point for digital communications. Examples of ports include but are not limited to, network cards, an IP address, a TCP or UDP port number, and the like.

The network 10 may be a digital or analog communications network, with a packet switched protocol network being one example. A particular example includes a plurality of computers electronically linked to one another and communicating data to one another in internet protocol (IP) format. The network 10 may be a physically wired network, may be a wireless network, or may be some combination of wired and wireless. Also, the protocol between bridge 12 and the users A-F may be that of a server and clients.

The network 10 may be useful for a number of data communication purposes. In an exemplary application, the network 10 is useful to facilitate a virtual meeting between attendees that are physically present at each of the users A-F. As used herein the term "virtual meeting" is intended to be broadly interpreted as a sharing of real-time communications between participants that are not physically present with one another. Examples of virtual meetings include an audio conference and/or a videoconference during which video and/or audio communications are shared in real-time between a plurality of users. As used herein the term "real-time" is intended to broadly refer to a condition of generally corresponding to actual time. For example, data is real-time if it takes about one minute of data playback to describe an event that took about one minute to occur. Accordingly, real-time data may comprise pre-recorded data so long as it plays back in substantially the same time duration in which it was recorded.

Communications with each of the users A-F may be carried out on a 2-way basis from the network 10, with data sent to and received from each of the users A-F over the communications lines represented as dashed line "pipes" 14. These may comprise physically wired connections such as copper wires, optical fiber cables, or the like; or may be wireless connections. Real-time video, audio, and other data may be sent from each of the users A-F to all others of the users A-F through the bridge 12 and over the communications lines 14.

Those knowledgeable in the art will appreciate that these communications may be carried out in any of a number of generally known procedures. For example, known methods of one or more of uni-, multi-, or broad-cast may be used. Also, the data may be streaming. Each user site may have one or more cameras, telephones and/or microphones, by way of further example, from each of which is streamed a continuous, real-time data stream on a particular multicast address and port number. As used herein the term continuous data stream is intended to broadly refer to a data stream sent in substantially continuous succession, although some degree of intermittency is contemplated. For example, a packetized data stream in IP may be "continuous" even though there may be some delay between packets.

One particular exemplary method for communicating and receiving the continuous data streams within the practice of the invention is according to the so-called "Real-time Transport Protocol" or "RTP." RTP is a widely supported Internet-standard protocol for the transport of real-time data, including audio and video. It can be used for media-on-demand as well as interactive services such as Internet telephony. RTP consists of a data and a control part. The latter is referred to as RTCP. The data part of RTP is a thin protocol providing support for applications with real-time properties such as continuous media (e.g., audio and video), including timing reconstruction, loss detection, security and content identification. RTP data is packetized in separate packets from RTCP control data, and RTP data is typically communicated across "data ports" while RTCP control data is communicated across "control ports."

Figure 2:
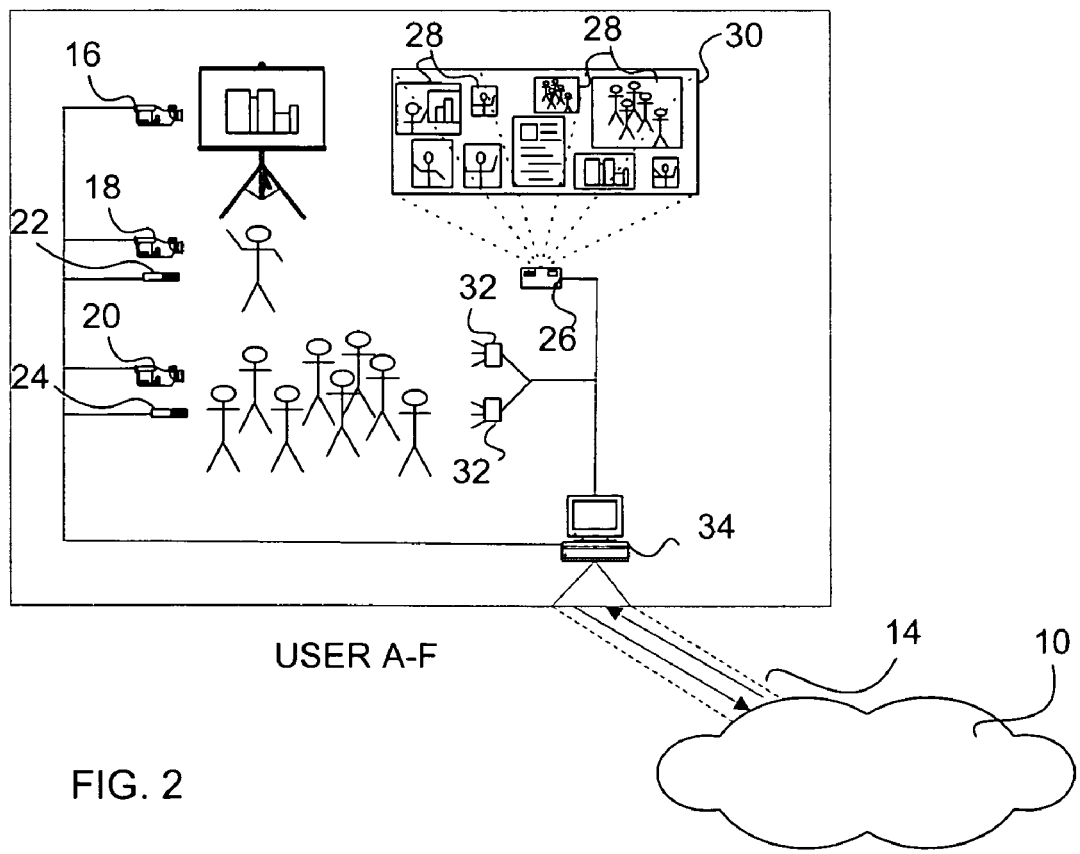
FIG. 2 is a schematic of a user of the network of FIG. 1.
Figure 3:
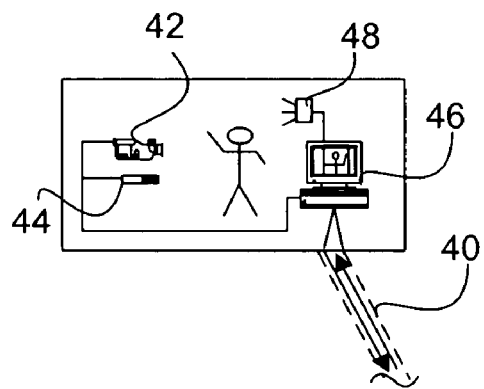
FIG. 3 is a schematic of one alternate user of the network of FIG. 1.

Communications of the streaming real-time data between users A-F may be further appreciated through consideration of the schematic of FIG. 2 that shows any of the users A-F in detail. The users A-F may be conference rooms that include multiple individuals that are all participating in the audio/video conference in some manner. Users A-F include three cameras shown as elements 16, 18 and 20 respectively. These three cameras may be trained on different people or things at the users A-F, with an example being camera 16 at a presentation board, camera 18 at a speaker, and camera 20 at an audience. A first microphone 22 may be provided for recording audio from the speaker and a second microphone 24 for recording audio from the audience. Although not illustrated, other cameras, microphones, computers, gateways, firewalls, multi-plexers, co/decoders and like devices may also be present. Also, it will be understood that FIG. 2 is exemplary only, and that a multitude of other configuration are possible for users A-F, which may also include many other devices other than cameras and microphones. FIG. 3 illustrates another exemplary configuration for any of users A-F. In FIG. 3, only a single camera 42 is provide and a single microphone 44. This might be useful, for example for allowing a single individual to participate in a videoconference.

In an exemplary videoconference, each of the users A-F not only sends video and audio data, but likewise receives video, audio, and other data communicated from each of the other users A-F. Referring once again to the schematic of FIG. 2 by way of example, one or more projectors 26 may be provided to project real-time video images 28 from one or more of the other users A-F on a screen 30. Any number of video images may be provided that show video data in real-time from any number of other cameras or other sources located at the other users. For example, the user A may simultaneously display video data streams from each of the other users B-F. Further, the video images displayed may include charts, graphs, documents, other digital files, replayed video files, and the like. One or more speakers 32 may also be provided to play real-time audio from the other users or other sources.

A particular example of a data file in addition to audio and video data includes shared documents having text, images, numerical values, and the like. For example, within a videoconference or virtual meeting different users at different locations may desire to all work on a single document. In such circumstances, continuous updates of the document should be communicated between users.

One or more computers 34 may be provided to receive and send all of the video, audio, documents, digital files and other data at the standard user A. An application program, such as an RTP application, may be running on the computer 34 that provides signal coding/decoding, signal compression/decompression, coordinates receiving and sending of the data streams, and controls some other aspects of sending and receiving of the data streams. For example, the computer 34 may be used to control which or how many video images 28 are displayed on the screen 30, to size the images 28, to set audio levels for the speakers 32, and the like. It will be appreciated that many alternatives to the computer 34 are possible, including dedicated processor based devices and the like.

In exemplary conference and other data communication events, each discrete data stream that is communicated may have a unique identifier associated with it. By way of example, methods, program products, and systems of the invention may be practiced across packet switched networks 10 that are configured for carrying discretely packetized data communications, with internet protocol ("IP") communications being one example, and RTP communications being a more specific example. In IP communications, continuous data is packed into discrete packets and provided with a destination address. The address may be a digital string, for instance, that identifies a port on the bridge 12 (FIG. 1). Each of the discrete packets of data may also include a unique identifier, such as a digital origination address.

The origination address may, for instance, be a digital string that identifies the computer 34, camera 18 or microphone 22 or 24 at the user A-F from which it originated (FIGS. 2-3). Within the RTP protocol, identifier information may be embedded into the header portion of individual packets by the RTP application programs running on the computers 34. For example, a particular data stream may have source identifying information such as an SSRC ("synchronization source" in RTP protocol) and/or another identifier that includes the user name, camera number, and IP address of the computer 34. The SSRC identifier carried in the RTP header and in various fields of RTCP packets is a random 32-bit number that is required to be globally unique within an RTP session.

According to the configurations of FIGS. 1-3, a real-time videoconference, or other virtual meeting can occur between the users A-F. A rich, immersive, and extensive virtual meeting environment may thus be provided that includes audio and/or video, and/or other streaming data shared in real-time between multiple participants at multiple locations. Participants at each of the users A-F may simultaneously hear and/or view data from all others of the users A-F. Such meetings may be desirable for corporations, universities, government, and other groups of people located remotely from one another that need to interact in a somewhat detailed manner.

Figure 4:
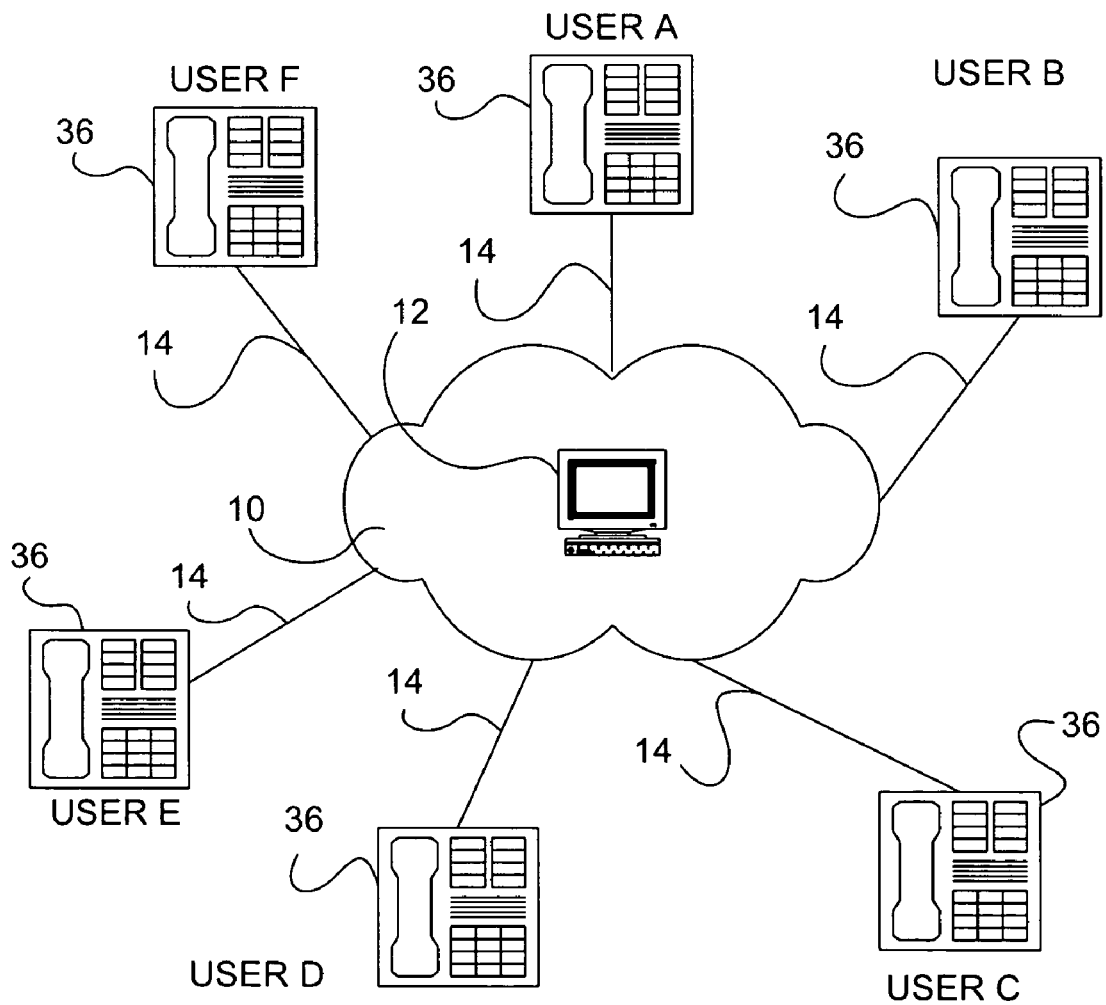
FIG. 4 is a schematic of the user network of FIG. 1 configured for an audio conference.

It will be understood that methods and program products of the present invention are suitable for practice in environments other than videoconferences. One alternative example is an audio conference. FIG. 4 is a schematic useful for illustrating this. FIG. 4 may be considered to be one of many alternate network environments to that illustrated in FIGS. 1-3 in which embodiments of the invention may be practiced. Some elements of FIG. 4 have been illustrated with a ' designation to indicate that they may be alternates to respective elements of FIGS. 1-3. In FIG. 4, each of the users A'-F' is represented by a telephone 36. Each telephone 36 is linked to the network 10 and the hub or bridge 12. Each of the users A-F may participate in a real-time audio conference in which each telephone 36 generates a real time audio data stream P in a packet data format (such as IP), and each user A-F receives all streams $P_A$-$P_F$. The telephones 36 may be IP handsets, wireless phones, traditional phones connected to a computer or other device for converting the standard telephony signal into packet-based data, or the like.

It will also be appreciated that the schematics of FIGS. 1 and 4 are simplified, and that in typical practice communication between users A-F (or A'-F') over the communications lines 14, network 10, and bridge 12 may be routed through a plurality of computers, routers, buffers, and the like. For instance, each communications line 14 may include multiple routers and buffers between users A-F and the network 10. One advantage of IP protocol communications is that each individual packet of data includes a destination address and may be routed over any of several available paths between origination and destination. Accordingly, each of the communications lines 14 may vary somewhat for different packets—some packets may traverse a different path than other packets between the same source and destination. Further, it will be appreciated that virtual meetings such as videoconferences and audio conferences may include different numbers of users than users A-F illustrated, and may, in fact, include tens, hundreds, or even more users.

It will also be appreciated that the network 10 and communications lines 14 may not be dedicated to only the virtual meeting or videoconference taking place, and may not be dedicated to the users A-F and the network 10. For example, many other users may be sharing each communications line 14 to communicate with the network 10. There may be substantial additional data traffic taking place over the communications line 14 during the videoconference or virtual meeting. This additional traffic may compete with the data streams being communicated between the users A-F for the bandwidth resources available over the communications lines 14. At times, insufficient bandwidth may be available to carry all of the competing traffic over one or more of the lines 14, with the result that some traffic is delayed or lost. This can lead to an unacceptable quality of communications between the users A-F.

It will be appreciated that when conducting virtual meetings according to the configurations of FIGS. 1-3 or similar, relatively large amounts of communication bandwidth and/or processor resources may be required. Referring to the examples of FIGS. 1 and 2, each of the several cameras and microphones at each of the users A-F is sent as a streaming real-time data stream to each of the other users A-F. It may be desirable to limit this bandwidth. It may also be desirable to limit the computational complexity of processing and communicating all of this data.

Referring to FIG. 1 by way of illustration, steps for reducing required resources include combining or bundling the audio streams P being generated from each microphone 22 and 24 at each of the users A-F into a single master stream M:

$$M = P_{22A} + P_{24A} + P_{22B} + P_{24B} + P_{22C} + P_{24C} + \ldots + P_{22F} + P_{24F}$$

The bundling may occur at the bridge 12. Alternatively, the individual streams P from each user A-F may first be bundled at the user A-F, and then communicated to the bridge 12 for further combination into the master stream M:

$$M=(P_{22}+P_{24})_A+(P_{22}+P_{24})_B+(P_{22}+P_{24})_C+ \ldots +(P_{22}+P_{24})_F$$

The bundled master audio stream M may then be communicated to each of the users A-F.

When performing this or similar steps using currently known methods, however, it may be difficult or impossible to adjust any of the individual audio streams P relative to one another within the master stream M. That is, while the volume of the entire master stream M can be adjusted using known methods, it is not convenient to adjust the volume of the individual streams P bundled within M relative to one another. Thus, for instance, if the microphone 22 at the user A (FIG. 1) is recording volume at a much higher level than the audio being recorded by microphone 22 at user F, user B may have difficulty hearing the audio data from microphone 22 at user F over the audio data generated from microphone 22 at user A. Methods and program products of the present invention are useful to address this and similar situations.

Exemplary methods and program products of the invention exploit the condition that audio signals Q and R can be combined to form signal S that, when decoded, "sounds like" some superposition of the audio represented by Q and R. There are at least two general categories of such mixing functions: convolutive (frequency domain processing) and instantaneous (time domain processing). The former often utilizes extensive filtering methods, while the latter is often easier to implement since it is generally based on scaling operations performed on the input. Instantaneous mixing is used in an exemplary embodiment of the present invention, although other invention embodiments may be practiced using other mixing methods, including (but not limited to) convolutive mixing.

In the case of linear pulse code modulation (PCM) signals, instantaneous mixing schemes for two audio streams Q and R include:

(1) The sample-wise sum of Q and R.
(2) The sample-wise maximum sound wave value of Q and R.
(3) Interleaving samples from Q and R.

Mixing scheme (1) (sample-wise summation) has the properties of addition and subtraction, which it has been discovered may be exploited through methods of the invention. Given a stream S=Q+R (created by mixing scheme 1), through methods of the invention a new modified stream S' can be generated:

$$S'=Q \cdot k_a+R \cdot k_b=S-[Q(1-k_a)+R(1-k_b)]$$

where $k_a$ and $k_b$ are constants. Other methods of the invention may be practiced using mixing schemes (2), (3), or others.

It will be appreciated that the "addition" operation suggested by S=Q+R may not truly be addition. An audio stream is not a scaler number so a traditional addition operator doesn't actually apply to it. As used herein, the "+" operator and/or the terms "addition" or "combining" when used in this context are intended to be broadly interpreted as defining a sample-wise sum. Likewise, the "−" operator and/or the term "subtraction" when used in this context is intended to be broadly interpreted as sample-wise difference. The "+" and "−" operators and/or terms "addition", "combining" or "subtraction" may likewise imply similar operations, for instance if a method of the invention was practiced with an interleaving mixing operation, "combining" or "subtracting" streams can be conditional interleaving and deinterleaving of streams.

Modifying S with D to form S' is not limited to linear PCM, although it is conveniently applied to linearized models. Non-linear representations of audio data, however, can typically be converted to linear models. PCM is believed to be one useful format for practice of exemplary methods of the invention. PCM has the advantages of being suitable for modeling substantially any soundwave, and being capable of linear representation. If sound data is represented in a different format that cannot conveniently be described using linear relations, methods of the invention contemplate converting that data to PCM and then practicing steps of the invention.

In an exemplary method of the invention, input audio streams $P_1, P_2, \ldots P_n$ are combined into a single master stream M without any gain or attenuation. This combination may occur through instantaneous mixing of the streams, and preferably occurs at a central network location such as at the bridge 12 (FIGS. 1, 3). Through steps of the invention, this master stream M will then be modified for each individual participant according to their desired volume settings.

Through steps of an exemplary invention method, each user or participant A-F (FIG. 1, or A'-F' of FIG. 4) provides a desired gain for one or more of the audio data streams being generated by other participants ($G_{AA}, G_{AB}, \ldots, G_{AF}$). This data may be maintained by the mixer. The mixer may comprise software running on the computer 12, for instance, or may be a hardware device in communication with the computer 12 or network 10. If the participant does not want to receive its own audio, the participant can set the gain on its own audio to 0. Those skilled in the art will appreciated that "gain" as used herein may be considered to be closely related to a volume level. Gain settings for a plurality of audio data streams can be used in a straightforward manner to determine the relative volume of each of those streams. Those knowledgeable in the art will also appreciate that methods are known for communicating these gain values, with an example including embedded DTMF signals or through the use of an external mechanism such as RTCP.

In a method of the invention, a step of forming a decompositor stream D for each participant z is then performed using the audio streams P and the gain values $G_z$ for each stream that the participant z specified as follows:

$$D_z=P_A(1-G_{zA})+P_B(1-G_{zB})+ \ldots P_F(1-G_{zF})$$

where G is any value from 0 to 1. It will be understood that the term "decompositor" is used herein only for convenience to refer the stream D, and is not intended to imply any limitations to the stream D that are not expressly made herein. The decompositor stream D is intended to be broadly interpreted as being a second stream created through one or more steps of the invention.

Preferably, only streams with input G values that differ from 0 are input to determine $D_z$. For example, if user z only input G values for streams A and C, then $D_z=P_A(1-G_{zA})+P_C(1-G_{zC})$. The decompositor stream $D_z$ is then used to modify the master stream M, with a volume adjusted master stream M' thereby created. M' is then transmitted to participant z. Modification may take the form of subtraction: $M_z'=M-D_z$. Other forms of modification are contemplated. This is repeated for each participant, and is preferably performed at a central network location such as the bridge 12. While these operations may also be performed locally, it may be preferable to perform centrally to reduce required communication bandwidth. Performing the operations centrally results in only one stream $M_z'$ being sent to each participant z.

An exemplary method of the invention may be further illustrated by reference to the flowchart of FIG. 5 in addition to FIGS. 1-4. At block 102, one audio data stream is received from each of the users A-F (FIG. 1, or A'-F' of FIG. 4): $P_A$, $P_B$, $P_C$, $P_D$, $P_E$, and $P_F$. Each stream P may include audio from one source, such as a microphone 22 (FIG. 1) or a telephone 36 (FIG. 4) at one of the users A-F (A'-F'), or may include multiple sources bundled together (e.g., microphones 22 and 24 from one user combined). Preferably the audio data streams P are in a linear format, with PCM being an example. If one or more of the streams P are not in a linear format, other methods of the invention may include an additional step(s) of converting the audio data to a linear representation. The plurality of streams P are then combined into the single master stream M. (block 104).

Volume values V are then received from the users A-F. (block 106). Volume values V may be received from some or all of the users A-F, who each may communicate one or more volume values V. The volume value V may also be referred to as, or expressed in terms of, a gain value G that can vary over a range as desired. Volume and gain are directly proportional; the higher the volume, the higher the gain. Volume is often logarithmic: $V=20 \log(G)$. Also, volume may be thought of as gain expressed in decibels. Those knowledgeable in the art will appreciate that there are many particular ways to express a volume value or gain that will be useful in practice of methods and program products of the present invention. By way of example, methods of the invention contemplate volume values V and/or gain values G that are useful to increase the volume of a specific stream.

A stream selection value SS is also received from one or more of the users, with each stream selection value SS corresponding to one of the volume values V and specifying which of the audio data streams P the volume value V corresponds to. That is, a user selects a volume value V and specifies through SS what stream P that volume value corresponds to. The volume values V and stream selector values SS may be provided, stored, and/or referred to in pairs for convenience: (V, SS).

Steps of setting a volume value V and a stream selection value SS may be carried out in many alternative steps. For example, a (V, SS) pair may be specified by input received when a user manipulates a graphical user interface (GUI) displayed on a computer 34 at any of the users A-F (FIG. 1). A suitable GUI may provide a list of audio streams and a volume setting. A user may select one of the streams by directing a selector to it on screen, and then may manipulate the volume setting. The volume setting may be displayed as a virtual "knob" or "slide" on screen which can be manipulated by the user. A second stream may then be selected and the volume adjusted in a similar manner. Another alternative for selecting (V, SS) may be through use of buttons on a telephone 36 (FIG. 4) keypad in addition to a menu or other display shown on the telephone 36.

Figure 5:
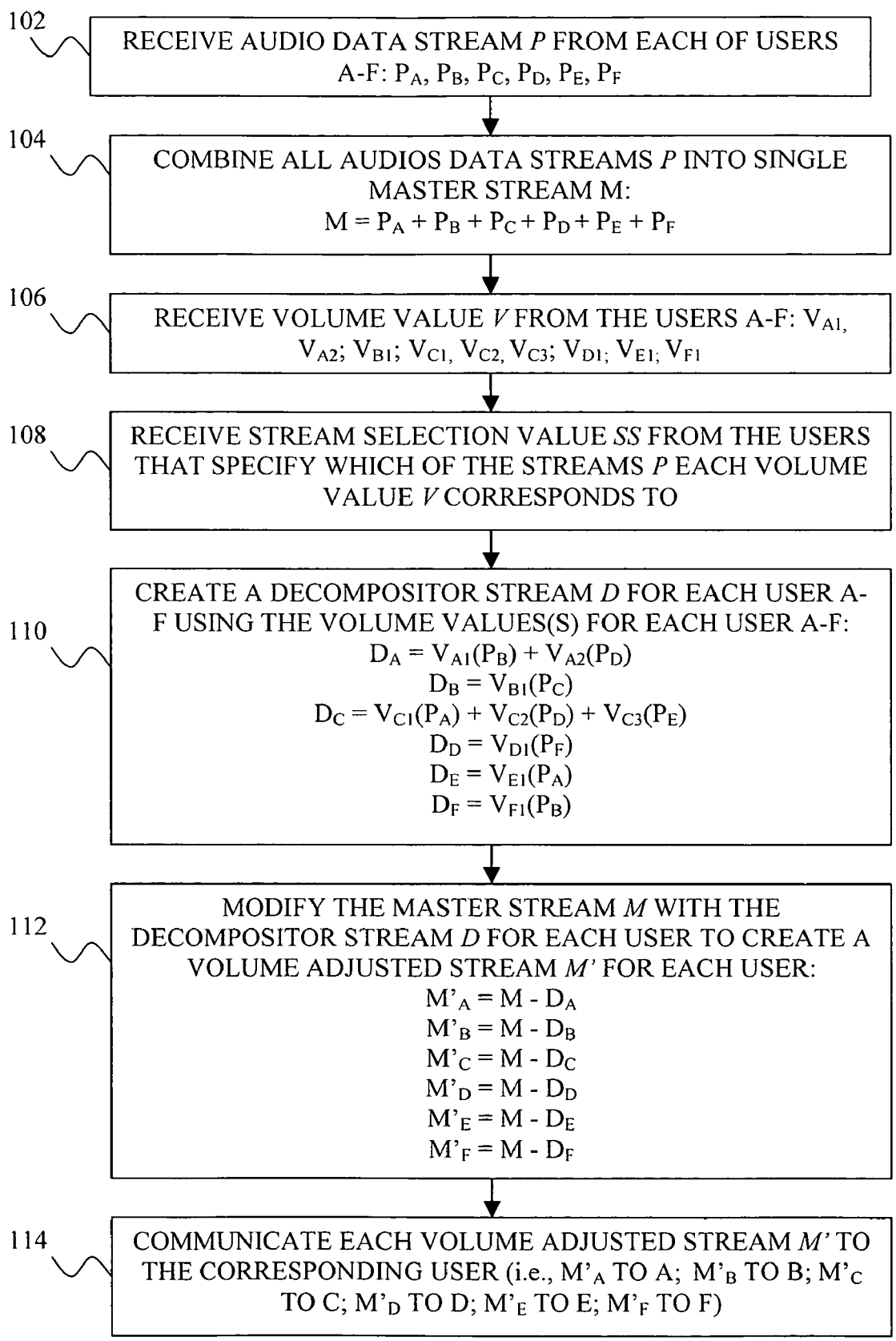
FIG. 5 is a flowchart illustrating one exemplary method of the invention.

Referring once again to the flowchart of FIG. 5, a decompositor stream D is created for each user A-F that has provided a volume value V. (block 110). The decompsitor stream D is created for each user by applying the volume value V to the stream P that corresponds to the stream selection value SS provided. Preferably, the decompositor stream D includes only streams that have been selected by the user for volume adjustment. By way of illustration the flowchart of FIG. 5 is premised on the hypothetical case that:

user A has provided two (V, SS) pairs: one volume value for the audio stream from user B ($V_{A1}$), and one volume value for the audio stream from user D ($V_{A2}$)

user B has provided one (V, SS) pairs: one volume value for the audio stream from user C ($V_{B1}$)

user C has provided three (V, SS) pairs: one volume value for the audio stream from user A ($V_{C1}$), one volume value for the audio stream from user D ($V_{C2}$), and one volume value for the audio stream from user D ($V_{C3}$)

user D has provided one (V, SS) pairs: one volume value for the audio stream from user F ($V_{D1}$)

user E has provided one (V, SS) pairs: one volume value for the audio stream from user A ($V_{E1}$)

user F has provided one (V, SS) pairs: one volume value for the audio stream from user B ($V_{F1}$)

By way of further illustration, if user A has specified that he desires to reduce the volume of audio from user B by 25% (e.g., $V_{A1}=25\%$ and/or gain $G_{A1}=0.75$) and decrease the volume of audio from user D by 10% (e.g., $V_{A2}=10\%$ and/or gain $G_{A2}=0.90$), then DA may be set:

$$D_A = P_B(0.25) + P_F(0.10)$$

The master stream M is then modified with the decompositor stream for each individual user to create a volume adjusted stream M' for each user. (block 112). That is, the master stream M is modified with the stream $D_A$ to create a volume adjusted stream $M_A'$ for user A; the master stream M is modified with the stream $D_B$ to create a volume adjusted stream $M_B'$ for user B; etc. Taking the above presented stream $D_A$ by way of example, volume adjusted stream M' may be represented as:

$$\begin{aligned} M' &= M - D_A \\ &= (P_A + P_B + P_C + P_D + P_E + P_F) - [P_B(0.25) + P_F(0.10)] \\ &= P_A + (0.75)P_B + P_C + P_D + P_E + (0.9)P_F \end{aligned}$$

Put another way, the volume of stream B has been reduced by 25% and the volume of stream F has been reduced by 10%. The resulting volume adjusted stream has been discovered to substantially represent the desired output—the relative volumes of the individual stream(s) P within the master stream M are changed as specified by V. The exemplary method of FIG. 5 contemplates modification through subtraction (e.g., sample wise difference), as well as other forms of modification.

The volume adjusted streams M' are then communicated to respective of the users A-F. (block 114). That is, the volume adjusted stream $M'_A$ is communicated to user A; the stream $M'_B$ is communicated to user B, etc. Through these steps, each of the users A-F (or A'-F') are able to receive an individualized volume adjusted master stream M' that provides volume adjusted individual streams as specified by that user. Further, the steps of the invention embodiment have achieved this result in a efficient manner that is processor and bandwidth friendly. These method steps as described to this point therefore offer many benefits and advantages over the prior art. For example, much of the redundancy found in known mixers is eliminated.

Other embodiments of the invention include additional steps that can further extend the advantages and benefits of its practice. For example, some embodiments of the invention may be practiced in environments where processor and/or bandwidth resources are at a premium, with an example being a conference with a high number of users and/or communicated data. Other invention embodiments contemplate additional steps to provide further benefits in these and other applications.

Some invention embodiments take advantage of recognizing that some audio data streams contain no useful data—they represent silent or near silent data. No volume adjustments need to be made on these streams. Some methods of the invention exploit this by including steps of setting a threshold silence level SL, and comparing each input stream P to the level SL. If P≦SL, no or very little noise is detected in that stream. SL can be set as desired, and for example may be at a level where background noise is detected but no speech. Those knowledgeable in the art will appreciate that silence detection algorithms are well known and can be incorporated into the receiving or decoding of the input signals in a straightforward manner. If a stream P falls below SL, methods of the invention may include steps of determining that the stream P should not be bundled in the master stream M.

Other embodiments of the present invention include additional novel steps for performing silence suppression or detection. While silence suppression is generally known, the present invention makes use of it in a novel and efficient manner. As discussed above, steps of using silence suppression to determine that a stream P should not be included in the master stream M when that stream falls below SL can offer some advantage. In practice, however, in some particular environments it can lead to undesirable results. For example, it can have the undesirable side effects of clipping the output and suppressing background noise. When a silent stream becomes active, some portion of the data may be lost due to reaction time required to determining that the stream P is no longer below the threshold SL. This can result in choppy output. Also, it has been discovered that a participant's audio experience in some environments is enhanced when some level of background noise is present. Even a minimal level of ambient noise, for instance, lets other participants know that a silent participant is "still on the line."

Some exemplary methods of the present invention exploit these discoveries and avoid the undesirable results of the prior art through the novel steps of applying silence suppression to the decompositor stream D instead of the master stream M. In essence, applying silence suppression to the decompositor stream D instead of M has the effect of determining when not to, rather than when to, remove a stream P from the master stream M. For this reason applying steps of silence suppression to the decompositor stream D may be more properly referred to herein as practicing silence detection.

These exemplary steps can be further illustrated as follows. Assume that a user has specified that streams $P_A$, $P_B$ and $P_F$ should be modified using gain settings $G_1$, $G_2$, and $G_3$ respectively. In one embodiment of the invention, then, a decompositor stream D would be created:

$$D=(1-G_1)(P_A)+(1-G_2)(P_B)+(1-G_3)(P_F)$$

and a volume adjusted master stream M':

$$M'=M-D$$

In another embodiment of the invention, additional steps of applying silence suppression (or silence detection) to the decompositor stream D are practiced. Assume the user has set a silence level SL. Streams $P_A$, $P_B$ and $P_F$ are then compared to the level SL, and it is determined that $P_A$ falls below SL. As a result, stream $P_A$ is not included in the decompositor stream D, which is then created as follows:

$$D=(1-G_2)(P_B)+(1-G_3)(P_F)$$

When the volume adjusted master stream M' is then formed (M'=M-D), stream $P_A$ will remain in it. That is, because the stream $P_A$ is not included in D it will not be "subtracted out" of M when D is subtracted from M to form M'. In effect, because stream $P_A$ was determined to have a minimal noise level it was further determined that it should be included in the volume adjusted master stream M'. The user receiving M' will therefore "hear" the silent or near silent stream $P_A$. A level of "comfort noise" (e.g., background noise) may therefore be present that confirms user A is still on the line. Also, if user A becomes active (e.g., starts to talk), no choppiness will result.

A number of additional steps may also be practiced within other methods of the invention. For example, exemplary methods of the invention may include steps that take advantage of cases where many participants are generating audio data simultaneously. This can increase the resources and processing that goes into generating and communicating D, M and M'. It has been discovered, however, that in many instances providing all of this simultaneous audio data offers little practical benefit since users receiving the data are unlikely to reasonably understand more than a handful of audio streams. Accordingly, some methods of the present invention set a maximum number of simultaneous streams to be included in D and/or M. Since M is created only one time, but D is created multiple times (once for each user), greater resource savings may be realized through focusing on minimizing D. Savings can also be had through minimizing M. The maximum number may be set as desired and is reasonable depending on factors such as the number of participants, the type of audio data being communicated, and the like. For many audio conference applications, it has been discovered that setting a maximum number of four audio streams to include in M and/or D can offer benefits (e.g., maximum of four simultaneous speakers). Accordingly, methods of the invention may includes steps of including only four streams P in M, and/or of including only four streams in D. Other maximum numbers are also contemplated, with three, five and six being examples. Selection of a particular maximum number will depend on factors such as type of audio data, application, and the like.

Exemplary methods of the invention may also include steps of assigning priority levels to each stream. For example, if a moderator in a conference is desired to be heard above all others, his stream P may have priority over all others, and any time that it contains speech data it may override all other streams. Similarly, in legal proceedings, medical proceedings, question and answer sessions, and the like, one stream P may be given priority over all others. Priority rankings may extend to numerous levels, so that one stream is highest priority, another is second highest, a third is third highest, a fourth is lowest, and so on.

Also, it may be desirable to attenuate muted streams, even when only background noise is present in those streams. Those skilled in the art will appreciate that attenuation is the inverse of gain—attenuation=(1/gain). Increasing attenuation is the same as decreasing gain and vice versa. Exemplary methods of the invention can accomplish this by adding a special case (G=0) to apply when determining which streams contribute to D. Put another way, using some embodiments of the invention that practice silence detection may result in "muted" streams not being completely muted (a user click "mute" but may still hear background noise). To address this special case, some methods of the invention will decomposite streams where G=0, even if they're below the silence threshold. This can degrade performance when a lot of muting is performed, so further optimization may be useful (although muting is generally faster than volume adjustment.) This might include performing set operations to find common sets of streams that contribute to each D (achieving 0 [lg(n)] performance.)

Exemplary methods of the invention may also achieve an enhanced audio experience for participants through steps of implementing automatic gain control on streams containing only background noise (e.g., streams P≦SL). This can offload this task from receiving terminals where more complicated steps and processing might otherwise be required.

It will be appreciated that methods and systems of the invention will prove beneficial in a multiplicity of different practice environments. By way of example and not limitation, real-time audio phone and data conferences and real-time video/audio conferences are believed to be well suited to the benefits and advantages that the present invention offers. Although not limited to any particular technology, methods of the present invention are believed to be well suited for packet-based network communications such as voice-over-internet-protocol ("VOIP") communications. It will also be appreciated that methods of the invention may offer increasing benefits and advantages over methods of the prior art as the number of real-time participants in a conference increases.

Put another way, methods of the present invention scale particularly well as compared to methods of the prior art. As the number of conference participants increases, the benefits and advantages of the present invention likewise increase. While the present invention is not limited to practice any particular number of real-time conference participants other than a simple plurality, it may be particularly advantageous when practiced with numbers real-time participants that number 10, 20, 50, 100, 1000, or even more.

Accordingly, through an exemplary embodiment of the invention a master stream M is created one time, then modified as appropriate for each participant to create a new volume adjusted stream M' for each participant. Generally, the present invention thereby avoids complicated steps of "forming" the desired data for each individual participant, but instead gathers all the data that might be desired and removes from this data what is not desired. This general strategy provides significant benefits and advantages in terms of required bandwidth resources, processing resources, simplicity, accuracy, and the like.

Exemplary Computer Program Exhibits

Those knowledgeable in the art will appreciate that the present invention is well suited for practice in the form of a computer program product that comprises computer executable instructions stored on a computer readable medium that when executed cause a computer to carry out steps of an embodiment of the invention. By way of describing a best-known mode of the invention, following are exemplary computer program exhibits illustrating various aspects of an embodiment of the invention.

EXAMPLE 1

Creating the Master Stream

```
// Create the master stream
static AudioMixer master(format);
for (p = clients.begin( ); p != clients.end( ); ++p) {
   master += p->second->Mixer( );
}
```

EXAMPLE 2

Decompositing to Create each Individual Stream

```
// Transmit composited stream to each composite-enabled site
for (p = clients.begin( ); p != clients.end( ); ++p) {
   if (p->second->IsComposite( )) {
   // Decomposite according to gain values set by user
   static AudioMixer composite(format);
   composite += master;
   p->second->Mixer( ).SetGain(256);
   composite -= p->second->Mixer( ); // Never include
   the site's own audio
   volumemap_t & volumemap = p->second->VolumeMap( );
   for (volumemap_t::iterator v = volumemap.begin( );
   v != volumemap.end( ); ++v) {
      // Do not attenuate if gain close to 1 (scaled by 256)
      if ((v->second < 246) || (v->second > 266)) {
         clientmap_t::iterator q = clients.find(v->first);
         if (q != clients.end( )) {
            // Do not waste time attenuating if site is already very quiet
            // unless a complete muting is required
            if (!q->second->IsSilent( ) || (v->second == 0)) {
               q->second->Mixer( ).SetGain(256 - v->second);
               composite -= q->second->Mixer( );
            }
         }
      }
   }
}
// Encode/transmit the composited stream
p->second->Consume(composite);
static RTP_DataPacket packet;
while (p->second->Encode(packet)) {
   packet.SetSourceID(0);
   if (!data_socket.SendTo(packet, 0, p->second->DataAddress( ))) {
      cerr << "Unable to write data socket: " << trerror(errno) << endl;
      exit(EXIT_FAILURE);
   }
}
}
}
```

EXAMPLE 3

A Function that Performs all the Decompositing Operations (Addition/Subtraction and Multiplication) in One Step

```
// Mix the contents of the specified queue into this queue
AudioMixer &
AudioMixer::operator += (AudioMixer & mixer)
{
   // make sure this queue is at least as big as the
   // specified queue; append silence if necessary
   int nextra = mixer.Blocks( ) - Blocks( );
   if (nextra > 0) PushAudio(nextra);
   const unsigned nmix = mixer.Samples( );
   switch (Format( ).Encoding( )) {
   case L16:
   { // mix 16-bit linear pcm
      assert(mixer.Format( ).Encoding( ) == L16);
      int16_t * sp = (int16_t *) mixer.Buffer( );
      int16_t * dp = (int16_t *) Buffer( );
      const unsigned gain = mixer.Gain( );
      for (unsigned n = 0; n < nmix; ++n) {
         *dp++ += (*sp++ * gain) >> 8;
      }
   }
```

```
        break;
    default:
        // unsupported encoding
        break;
    }
    return *this;
}
```

What is claimed is:

1. A method for communicating audio data streams between a plurality of users over a packet based network, the method comprising the steps of:
   combining a plurality of real time audio data streams into a single master stream;
   receiving at least one volume value for at least one of said plurality of audio data streams from each of a plurality of users;
   creating a second stream for each of said plurality of users using said at least one volume value from said each of said plurality of users; and,
   modifying said master stream by subtracting said second stream from said master stream to create a volume adjusted master stream for each of said plurality of users.

2. A method as defined by claim 1 wherein said at least one volume value comprises a plurality of volume values from each of said users, one each of said volume values for one each of said plurality of data streams, and wherein the step of creating said second stream comprises applying each of said plurality of volume values to one each of said plurality of data streams and combining the results.

3. A method as defined by claim 1 wherein the step of receiving said at least one volume value from each of said plurality of users further comprises receiving a corresponding stream selection value that specifies which of said plurality of audio streams said volume value applies to, and wherein the step of creating said second stream comprises applying said at least one volume value to said at least one audio data stream that corresponds to said at least one selection value.

4. A method as defined by claim 3 wherein said at least one volume value comprises a plurality of volume values, and wherein said at lest one selection value comprises a plurality of selection values, each of said plurality of selection values corresponding to one each of said volume values.

5. A method as defined by claim 1 wherein said plurality of audio data streams are communicated from said plurality of users.

6. A method as defined by claim 1 wherein said volume value comprises a gain value G, and wherein the step of creating said second stream comprises multiplying said at least one audio data stream by (1-G).

7. A method as defined by claim 1 wherein said plurality of users are connected to one another by a bridge, and wherein the step of combining said plurality of audio streams into a single master stream and the step of creating said volume adjusted master stream are performed at said bridge.

8. A method as defined by claim 1 and further including the step of communicating said volume adjusted master stream for each of said plurality of users to said each of said plurality of users.

9. A method as defined by claim 1 and further including the step of applying silence detection to said second stream.

10. A method as defined by claim 1 and further including the step of comparing each of said at least one audio data streams included in said second stream to a silence threshold level and removing any of said at least one audio data streams from said second stream if said any of said at least one audio data streams is below said silence threshold level.

11. A method as defined by claim 1 and further including the step of limiting said master stream to no more than four of said plurality of audio data streams.

12. A method as defined by claim 1 and further including the step of limiting said second stream to include no more than four of said plurality of audio data streams.

13. A method as defined by claim 1 and further including the initial step of representing said plurality of audio data streams received from said plurality of users with a linear model.

14. A method as defined by claim 1 wherein the step of combining said plurality of audio data streams comprises performing a sample wise sum of said plurality of audio data streams.

15. A method as defined by claim 1 wherein the step of combining a plurality of real time audio data streams into said single master stream comprises combining said audio streams through instantaneous mixing and sample-wise summation of said streams.

16. A method as defined by claim 1 wherein the step of creating said second stream comprises combining a plurality of audio data streams into said second stream, whereby said second stream comprises a plurality of individual audio streams combined into a single stream.

17. A method as defined by claim 1 wherein the step of combining said plurality of audio streams into a master stream comprises combining a plurality of audio streams that have not been modified to adjust for volume, wherein said master stream includes a plurality of audio streams that are not volume adjusted.

18. A computer program product for controlling audio data being communicated over a packet based data network, the program product including computer readable instructions that when executed by one or more computers cause the one or more computers to perform the steps of:
   a) combining a plurality of real-time audio data streams into a single master stream;
   b) receiving at least one volume value and at least one stream selection value from one of a plurality of users, said selection value specifying which of said plurality of said audio data streams said volume value corresponds to;
   c) creating a decompositor stream for said one user by applying said at least one volume value to said audio data stream specified by said selection value;
   d) applying silence detection to said decompositor stream;
   e) creating a volume adjusted master stream for said one user by subtracting said decompositor stream from said master stream; and,
   f) communicating said volume adjusted master stream to said one user.

19. A computer program product as defined by claim 18 wherein the computer readable instructions when executed by the computer further cause the one or more computers to repeat steps b) - f) for each of said plurality of users wherein the computer communicates an individualized volume adjusted master stream to each of said plurality of users.

20. A method for controlling audio data being communicated between a plurality of n users over a packet based network, the method comprising the steps of:
   receiving at least one real time audio stream P from each of said plurality of users;

combining each of said real time audio streams P into a single master stream M, where $M=P_1+P_2+P_3 \ldots +P_n$;

receiving gain values G from each of said plurality of users along with a corresponding stream selection value indicating which of said plurality of real time streams said gain value corresponds to;

creating a decompositor stream D for each of said plurality of users, where $D=P_1(1-G_1)+P_2(1-G_2)+P_3(1-G_3) \ldots + P_n(1-G_n)$; and, creating a volume adjusted master stream M' for each of said plurality of users, where $M'=M-D$.

\* \* \* \* \*